(12) United States Patent
Kaneko

(10) Patent No.: US 9,624,969 B2
(45) Date of Patent: *Apr. 18, 2017

(54) THRUST SLIDING BEARING

(71) Applicant: Oiles Corporation, Minato-ku, Tokyo (JP)

(72) Inventor: Ryohei Kaneko, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 153 days.

This patent is subject to a terminal disclaimer.

(21) Appl. No.: 14/023,676

(22) Filed: Sep. 11, 2013

(65) Prior Publication Data

US 2014/0010485 A1  Jan. 9, 2014

Related U.S. Application Data

(62) Division of application No. 12/936,008, filed as application No. PCT/JP2009/001541 on Apr. 1, 2009.

(30) Foreign Application Priority Data

Apr. 2, 2008  (JP) .................................. 2008-095901

(51) Int. Cl.
*F16C 17/04* (2006.01)
*B60G 11/15* (2006.01)
(Continued)

(52) U.S. Cl.
CPC .............. *F16C 17/04* (2013.01); *B60G 11/15* (2013.01); *B60G 15/06* (2013.01); *F16C 17/10* (2013.01);
(Continued)

(58) Field of Classification Search
CPC ........... F16C 17/04; F16C 33/20; F16F 1/126; B60G 15/06; B60G 11/15; B60G 2204/112; B60G 2204/124; B60G 2204/418

See application file for complete search history.

(56) References Cited

U.S. PATENT DOCUMENTS 4,699,530 A * 10/1987 Satoh .................... B60G 15/068
                                                    280/124.155
4,854,745 A *  8/1989 Kamimura ........... B60G 15/068
                                                    384/124
(Continued)

FOREIGN PATENT DOCUMENTS

IT  DE 3214586 A1 * 11/1982  ........... B60G 15/068
JP  2001-173658       6/2001
(Continued)

OTHER PUBLICATIONS

U.S. Office Action issued in U.S. Appl. No. 12/936,008 dated Nov. 9, 2015. (1207-181).

(Continued)

*Primary Examiner* — Daniel Yabut
(74) *Attorney, Agent, or Firm* — Nixon & Vanderhye P.C.

(57) ABSTRACT

A thrust sliding bearing 1 includes: a synthetic resin-made upper casing 3 which has a vehicle body-side seat surface 10 for a mounting member 8 on a vehicle body side and an annular lower surface 2; a synthetic resin-made lower casing 5 on which an annular upper surface 4 opposed to the annular lower surface 2 and a spring seat surface 25 for a suspension coil spring 7 are integrally formed, and which is superposed on the upper casing 3 so as to be rotatable about an axis O of the upper casing 3 in an R direction; and a synthetic resin-made thrust sliding bearing piece 6 which is disposed in an annular gap 9 between the annular lower surface 2 and the annular upper surface 4, and has an annular thrust sliding bearing surface 51 which slidably abuts against at least one of the annular lower surface 2 and the annular upper surface 4.

6 Claims, 7 Drawing Sheets

(51) Int. Cl.
  *B60G 15/06* (2006.01)
  *F16C 17/10* (2006.01)
  *F16C 33/20* (2006.01)
  *F16C 33/74* (2006.01)
  *F16F 1/12* (2006.01)

(52) U.S. Cl.
  CPC ............. *F16C 33/20* (2013.01); *F16C 33/74* (2013.01); *F16F 1/126* (2013.01); *B60G 2202/112* (2013.01); *B60G 2204/124* (2013.01); *B60G 2204/418* (2013.01); *F16C 2361/53* (2013.01)

(56) References Cited

U.S. PATENT DOCUMENTS

| | | | | |
|---|---|---|---|---|
| 6,267,512 | B1* | 7/2001 | Beghini | B60G 15/068 384/607 |
| 6,736,381 | B2* | 5/2004 | Chesne | B60G 15/063 267/220 |
| 7,192,041 | B2* | 3/2007 | Nicot | B60G 17/019 188/321.11 |
| 8,066,435 | B2* | 11/2011 | Miyata | B60G 15/068 280/124.147 |
| 2002/0171222 | A1* | 11/2002 | Tadano | B60G 15/067 280/124.155 |
| 2004/0104552 | A1* | 6/2004 | Nicot | B60G 17/04 280/124.155 |
| 2005/0247531 | A1* | 11/2005 | Oota | F16F 9/58 188/322.19 |
| 2006/0215945 | A1 | 9/2006 | Miyata et al. | |
| 2007/0144850 | A1* | 6/2007 | Hattori | B60G 3/06 188/322.16 |
| 2007/0267793 | A1* | 11/2007 | Chamousset | B60G 15/068 267/220 |
| 2008/0031562 | A1* | 2/2008 | Poulle | B60G 11/15 384/618 |
| 2008/0310780 | A1* | 12/2008 | Watai | B60G 15/068 384/420 |
| 2010/0104228 | A1* | 4/2010 | Kaneko | B60G 15/068 384/420 |

FOREIGN PATENT DOCUMENTS

| | | | |
|---|---|---|---|
| JP | 2003-269458 | 9/2003 | |
| JP | 2004-293589 | 10/2004 | |
| JP | EP 1548303 A1 * | 6/2005 | ............. F16C 17/04 |
| JP | 2005-291232 | 10/2005 | |
| JP | 2006-162019 | 6/2006 | |
| JP | WO 2007132556 A1 * | 11/2007 | ............. F16C 17/04 |
| JP | WO 2008004338 A1 * | 1/2008 | ............. F16C 17/04 |
| JP | EP 2128464 A1 * | 12/2009 | ........... B60G 15/068 |

OTHER PUBLICATIONS

International Search Report for PCT/JP2009/001541, mailed Jun. 23, 2009.

JP Office Action in JP 2008-095901 received Nov. 28, 2012.

* cited by examiner

THRUST SLIDING BEARING

This application is a divisional of application Ser. No. 12/936,008 filed Oct. 1, 2010, which in turn is a national phase of International Application No. PCT/JP2009/001541, filed Apr. 1, 2009, which designated the US and claims priority to Japanese Patent Application No. 2008-095901, filed Apr. 2, 2008, the entire contents of each of which are hereby incorporated by reference.

TECHNICAL FIELD

The present invention relates to a synthetic resin-made thrust sliding bearing, and more particularly to a thrust sliding bearing which is suitably incorporated as a thrust sliding bearing of a strut-type suspension (Macpherson type) in a four-wheeled motor vehicle.

BACKGROUND ART

Particularly in Patent Document 1, a sliding bearing is proposed which is comprised of an upper casing formed of a synthetic resin and having a vehicle body-side seat surface for a vehicle body side and an annular lower surface; a lower casing which is formed of a synthetic resin, is superposed on the upper casing so as to be rotatable about the axis of the upper casing, and has an annular upper surface opposed to the annular lower surface of the upper casing; and an annular thrust sliding bearing piece which is formed of a synthetic resin, and is interposed between the annular lower surface and the annular upper surface, wherein a spring seat surface for a suspension coil spring is integrally formed on a portion of the lower casing on an outer peripheral side of the vehicle body-side seat surface and the thrust sliding bearing piece. According to such a sliding bearing, since the spring seat surface for the suspension coil spring is provided on the lower surface, it is possible to dispense with a spring seat member made of sheet metal.

PRIOR ART DOCUMENT

Patent Document

Patent Document 1: JP-A-2004-293589

SUMMARY OF THE INVENTION

Problems that the Invention is to Solve

Incidentally, with such a sliding bearing, since the spring seat surface is formed on the portion of the lower casing on the outer peripheral side of the vehicle body-side seat surface and the thrust sliding bearing piece, when the vehicle body load is supported, there is a possibility that deflection is likely to occur in such as the lower surface where the spring seat surface is integrally formed.

The present invention has been devised in view of the above-described aspects, and its object is to provide a thrust sliding bearing which is capable of reducing the possibility that deflection is likely to occur when the vehicle body load is supported.

Means for Overcoming the Problems

A thrust sliding bearing in accordance with the invention includes: a synthetic resin-made upper casing which has a vehicle body-side seat surface for a vehicle body side and an annular lower surface; a synthetic resin-made lower casing on which an annular upper surface opposed to the annular lower surface and a spring seat surface for a suspension coil spring are integrally formed, and which is superposed on said upper casing so as to be rotatable about an axis of said upper casing; and a thrust sliding bearing piece which is disposed in an annular gap between the annular lower surface and the annular upper surface, and has an annular thrust sliding bearing surface which slidably abuts against at least one of the annular lower surface and the annular upper surface, wherein the vehicle body-side seat surface, the thrust sliding bearing surface, and the spring seat surface are arranged by being juxtaposed to each other in an axial direction.

According to the thrust sliding bearing in accordance with the invention, since, in particular, the vehicle body-side seat surface, the thrust sliding bearing surface, and the spring seat surface are arranged by being juxtaposed to each other in the axial direction, it is possible to reduce the possibility that deflection is likely to occur in such as the lower casing where the spring seat surface is integrally formed when the vehicle body load is supported.

In a preferred example of the thrust sliding bearing in accordance with the invention, a portion of the spring seat surface where the suspension coil spring abuts, the vehicle body-side seat surface, and the thrust sliding bearing surface are arranged in series to each other in the axial direction. According to such a preferred example, it is possible to further reduce the possibility that the deflection is likely to occur.

In another preferred example of the thrust sliding bearing in accordance with the invention, said thrust sliding bearing piece has the annular thrust sliding bearing surface which slidably abuts against the annular lower surface, and said lower casing has a plurality of recessed portions or hole portions formed in the annular upper surface. According to such a preferred example, deformations such as expansion and shrinkage based on thermal change at the time of injection molding of the synthetic resin-made lower casing can be allowed to take place locally at the aforementioned plurality of recessed portions or hole portions. Hence, it is possible to prevent a decline in the fabrication accuracy of the lower casing on which the spring seat surface is integrally formed, particularly a decline in the fabrication accuracy of the annular upper surface of the lower casing.

In still another preferred example of the thrust sliding bearing in accordance with the invention, the plurality of recessed portions or hole portions are arranged at equal intervals in a circumferential direction.

In a further preferred example of the thrust sliding bearing in accordance with the invention, said lower casing includes an annular base portion having the annular upper surface formed thereon and a cylindrical portion formed integrally on a lower portion of the annular base portion, the spring seat surface is formed by an outer peripheral surface of the cylindrical portion and a lower surface of the annular base portion, and a portion formed by the lower surface of the annular base portion of the spring seat surface where the suspension coil spring abuts, the vehicle body-side seat surface, and the thrust sliding bearing surface are arranged in series to each other in the axial direction. According to such a preferred example, it is possible to further reduce the possibility that the deflection is likely to occur.

In a still further preferred example of the thrust sliding bearing in accordance with the invention, said upper casing includes an annular base portion having the vehicle body-side seat surface formed on its upper surface and the annular lower surface formed on its lower surface, and an outer cylindrical suspended portion which is suspended from an outer peripheral portion of the annular base portion toward a side of said lower casing, and an inside diameter of the outer cylindrical suspended portion at its end portion on the lower casing side is gradually enlarged as a position of the inner peripheral surface of the end portion is located gradually away from the annular base portion in the axial direction. According to such a preferred example, it is possible to suitably prevent the ingress of muddy water from the end portion on the lower casing side of the outer cylindrical suspended portion between the upper casing and the lower casing.

In a further preferred example of the thrust sliding bearing in accordance with the invention, a portion of an outer peripheral surface of said lower casing opposed to the end portion of the outer cylindrical suspended portion on the lower casing side is located gradually away from the end portion as the position of the outer peripheral surface of said lower casing is located away from the annular base portion of said upper casing.

In a further preferred example of the thrust sliding bearing in accordance with the invention, an annular engaging hook portion having a shape of a recessed surface for engaging said lower casing is formed on an inner peripheral surface of the outer cylindrical suspended portion, and the engaging hook portion is adjacent to the end portion of the outer cylindrical suspended portion on the lower casing side.

The thrust sliding bearing in accordance with the invention is preferably used as a thrust sliding bearing of a strut-type suspension in a four-wheeled motor vehicle.

In the thrust sliding bearing in accordance with the invention, the upper casing and the thrust sliding bearing piece may be formed of a synthetic resin. In such a case, the synthetic resin for forming the upper casing and the lower casing may be a thermoplastic synthetic resin such as polyacetal resin, polyamide resin, or polyester resin. In addition, the synthetic resin for forming the thrust sliding bearing piece may be a thermoplastic synthetic resin such as polyacetal resin, polyamide resin, polyolefin resin, or polyester resin.

Advantages of the Invention

According to the invention, it is possible to provide a thrust sliding bearing which is capable of reducing the possibility that deflection is likely to occur when the vehicle body load is supported.

MODE FOR CARRYING OUT THE INVENTION

Figure 1:
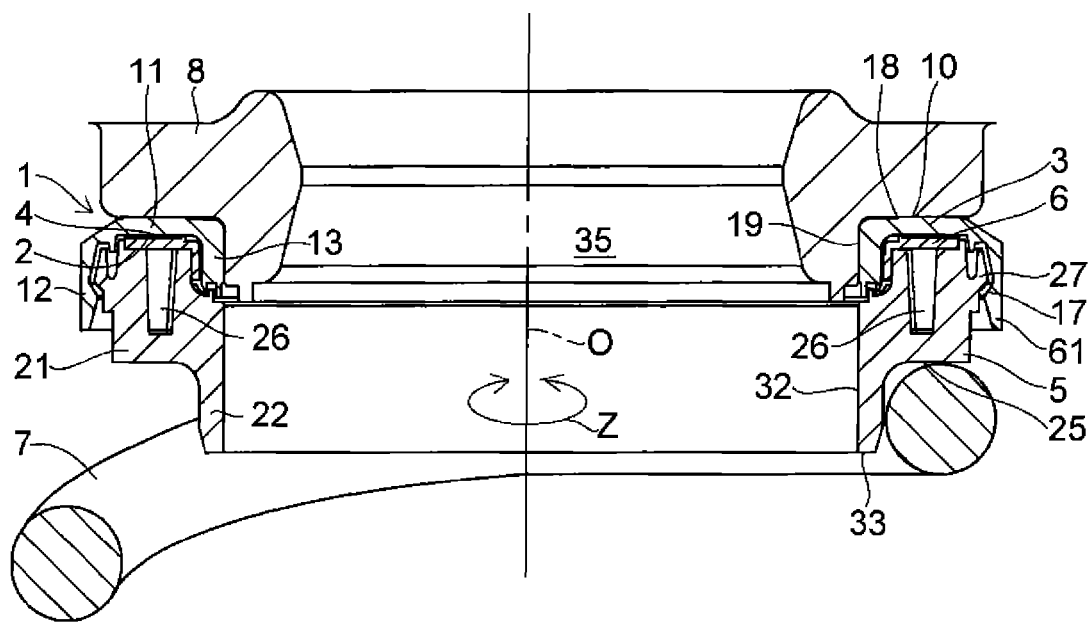
FIG. 1 is an explanatory cross-sectional view of an embodiment of the invention.
Figure 2:
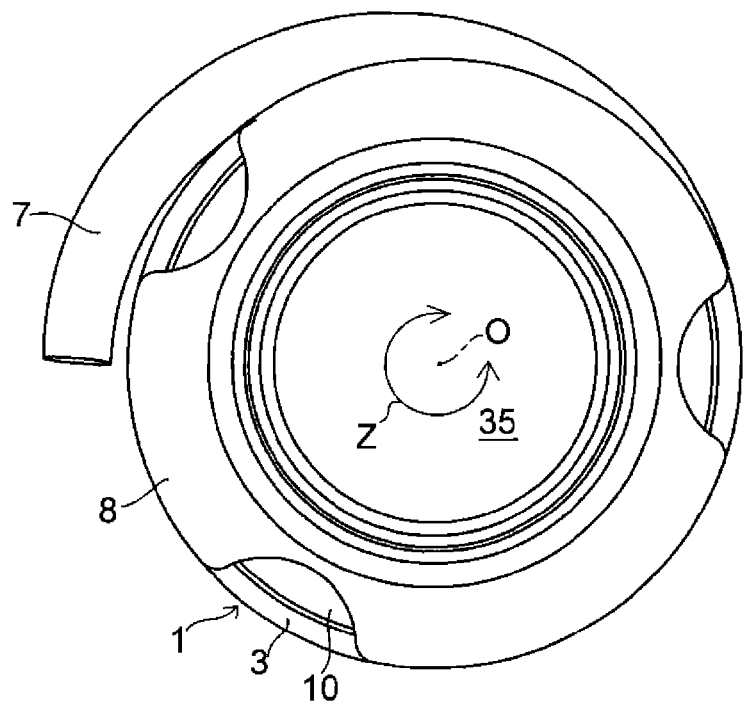
FIG. 2 is an explanatory plan view of the embodiment shown in FIG. 1.
Figure 3:
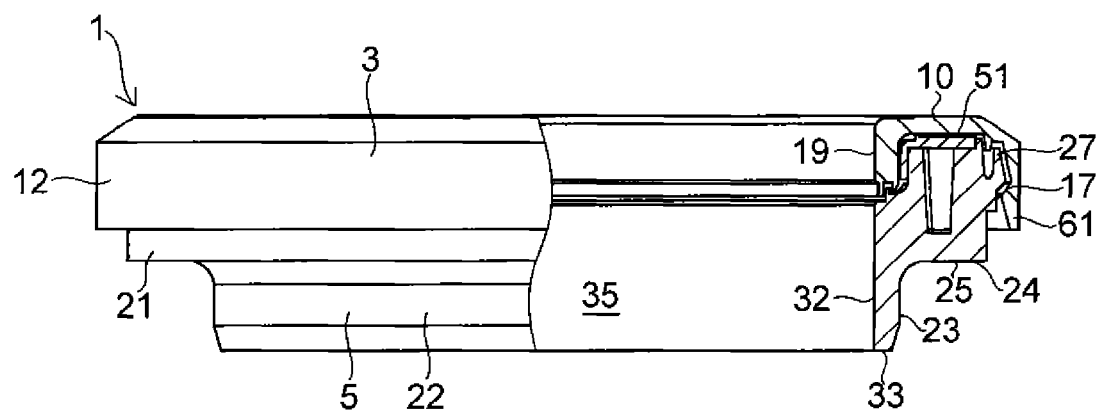
FIG. 3 is an explanatory fragmentary view of the thrust sliding bearing of the embodiment shown in FIG. 1.
Figure 4:
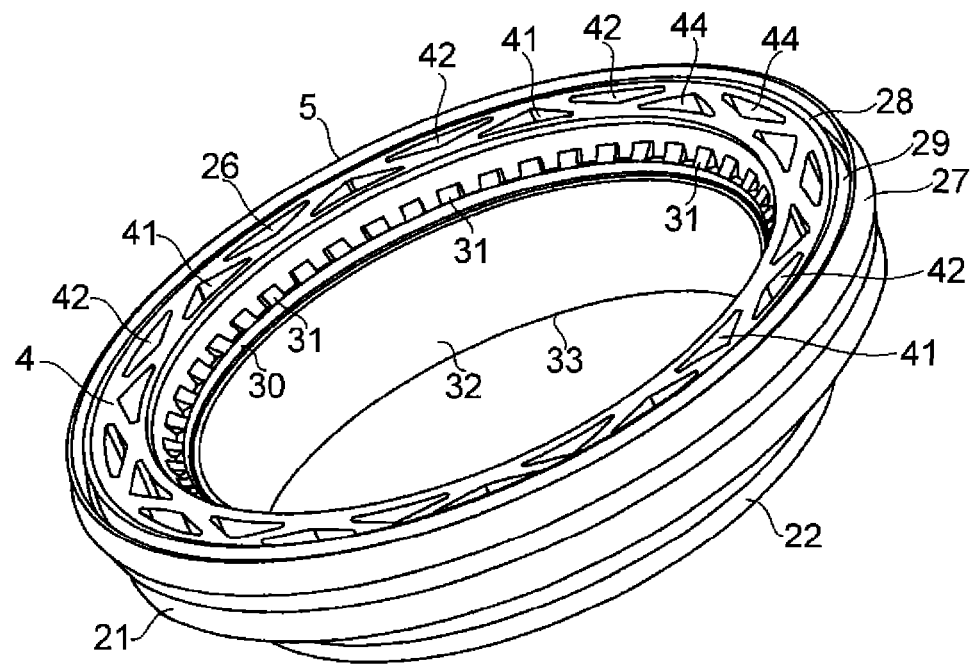
FIG. 4 is an explanatory perspective view of a lower casing of the embodiment shown in FIG. 1.
Figure 5:
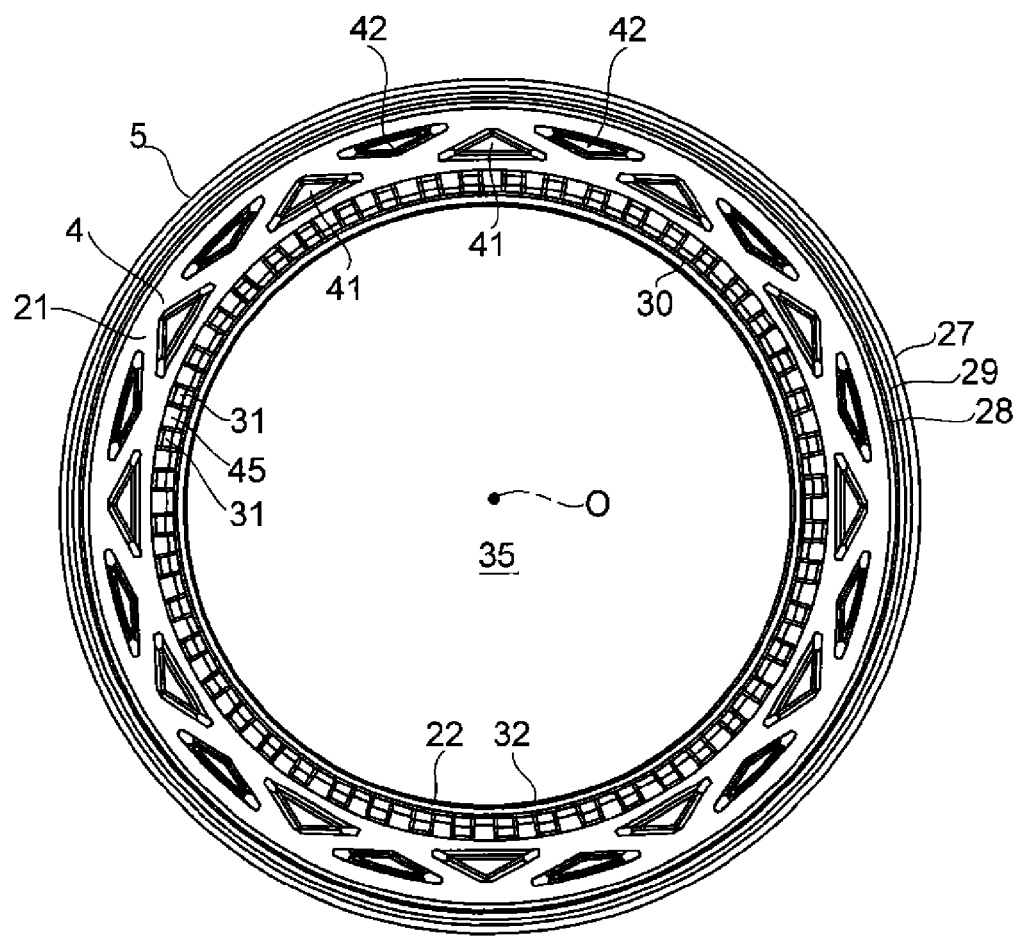
FIG. 5 is an explanatory plan view of the lower casing shown in FIG. 4.

Hereafter, a more detailed description will be given of the present invention on the basis of the preferred embodiments illustrated in the drawings. It should be noted that the present invention is not limited to these embodiments.

In FIGS. 1 to 9, a thrust sliding bearing 1 in accordance with this embodiment for use as a strut-type suspension in a four-wheeled motor vehicle is comprised of an annular upper casing 3 which is formed of a synthetic resin such as polyacetal resin and has a vehicle body-side seat surface 10 for a mounting member 8 on the vehicle body side and an annular lower surface 2; an annular lower casing 5 which is formed of a reinforced synthetic resin including a synthetic resin such as polyacetal resin and reinforcing fibers such as glass fibers contained in this polyacetal resin, on which an annular upper surface 4 opposed to the annular lower surface 2 and a spring seat surface 25 for a suspension coil spring 7 are integrally formed, and which is superposed on the upper casing 3 so as to be rotatable about an axis O of the upper casing 3 in an R direction; and an annular thrust sliding bearing piece 6 which is formed of a synthetic resin such as polyacetal resin, is disposed in an annular gap 9 between the annular lower surface 2 and the annular upper surface 4, and has an annular thrust sliding bearing surface 51 which slidably abuts against at least one of the annular lower surface 2 and the annular upper surface 4, i.e., the annular lower surface 2 in this embodiment.

The upper casing 3 includes a circular ring-shaped base portion 11 having the vehicle body-side seat surface 10 formed on its upper surface and the annular lower surface 2 formed on its lower surface; an outer cylindrical suspended portion 12 which is suspended from an outer peripheral portion of the circular ring-shaped base portion 11 toward the lower casing 5 side; and an inner cylindrical suspended portion 13 which is suspended from an inner peripheral portion of the circular ring-shaped base portion 11 toward the lower casing 5 side. The outer cylindrical suspended portion 12 and the inner cylindrical suspended portion 13 are integrally formed on the circular ring-shaped base portion 11. The annular lower surface 2 is formed by the lower surface of the circular ring-shaped base portion 11 between the outer cylindrical suspended portion 12 and the inner cylindrical suspended portion 13.

An annular projection 15 projecting toward the lower casing 5 is formed on a portion of the lower surface of the circular ring-shaped base portion 11 which is on the side of the outer cylindrical suspended portion 12. An annular recessed groove 16 which is recessed with respect to the lower casing 5 is formed on the lower surface of the inner cylindrical suspended portion 13. An annular engaging hook portion 17 is formed on the inner peripheral surface of the outer cylindrical suspended portion 12.

An upper surface 18 of the circular ring-shaped base portion 11 and an inner peripheral surface 19 of the inner cylindrical suspended portion 13 abut against the mounting member 8, as shown, for example, in FIG. 1.

The lower casing 5 includes a circular ring-shaped base portion 21 having the annular upper surface 4 formed on its upper surface; a cylindrical portion 22 formed integrally on a lower portion of the inner periphery of the circular ring-shaped base portion 21 in such a manner as to be suspended from the circular ring-shaped base portion 21; the spring seat surface 25 for a suspension coil spring which is integrally formed by an outer peripheral surface 23 of the cylindrical portion 22 and an annular lower surface 24 of the circular ring-shaped base portion 21; and a plurality of recessed portions or hole portions, i.e., a plurality of recessed portions 26 in this embodiment, which are formed in the annular upper surface 4 and arranged at equal intervals in the circumferential direction.

An annular engaged hook portion 27 is integrally formed on the outer peripheral surface of the circular ring-shaped base portion 21. The engaging hook portion 17 has the shape of a recessed surface, while the engaged hook portion 27 has the shape of a protruding surface complementary to the shape of the recessed surface. When the upper casing 3 is superposed on the lower casing 5, the engaging hook portion 17 is restorably deflected while being brought into sliding contact with the engaged hook portion 27, and is engaged with that engaged hook portion 27.

An annular projection 28 projecting toward the upper casing 3 is integrally formed on a portion of the upper surface of the circular ring-shaped base portion 21 which is on the side of the engaged hook portion 27. An annular recessed groove 29 which is recessed with respect to the upper casing 3 is formed between the engaged hook portion 27 and the annular projection 28. The annular projection 15 is disposed in such an annular recessed groove 29.

Figure 6:
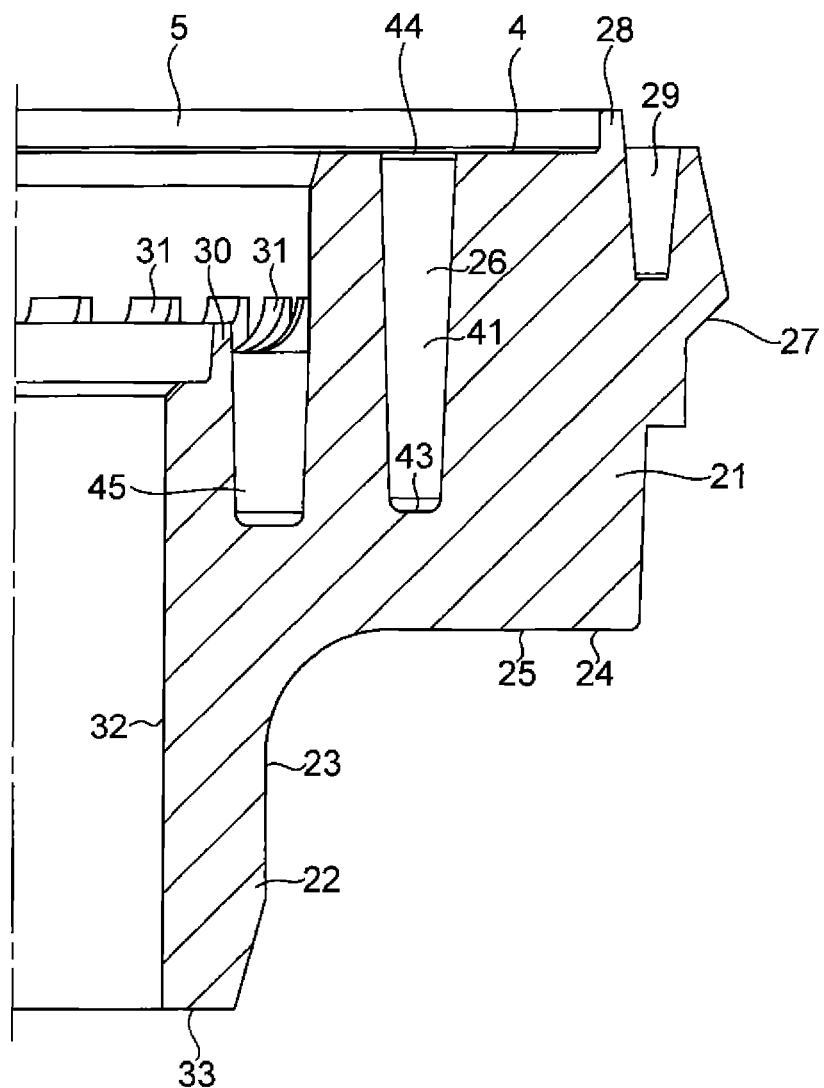
FIG. 6 is an explanatory cross-sectional view taken along line V-V in the direction of arrows shown in FIG. 4.
Figure 7:
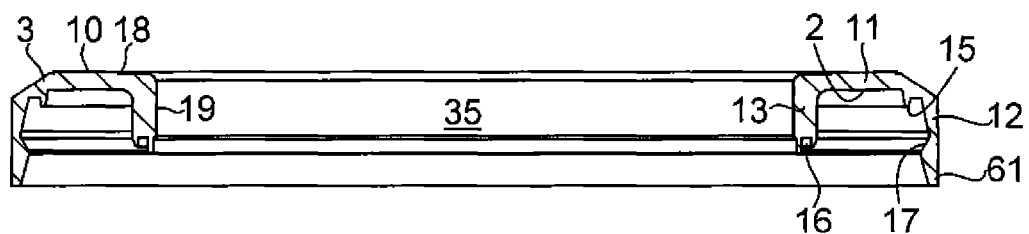
FIG. 7 is an explanatory cross-sectional view of an upper casing of the embodiment shown in FIG. 1.
Figure 8:
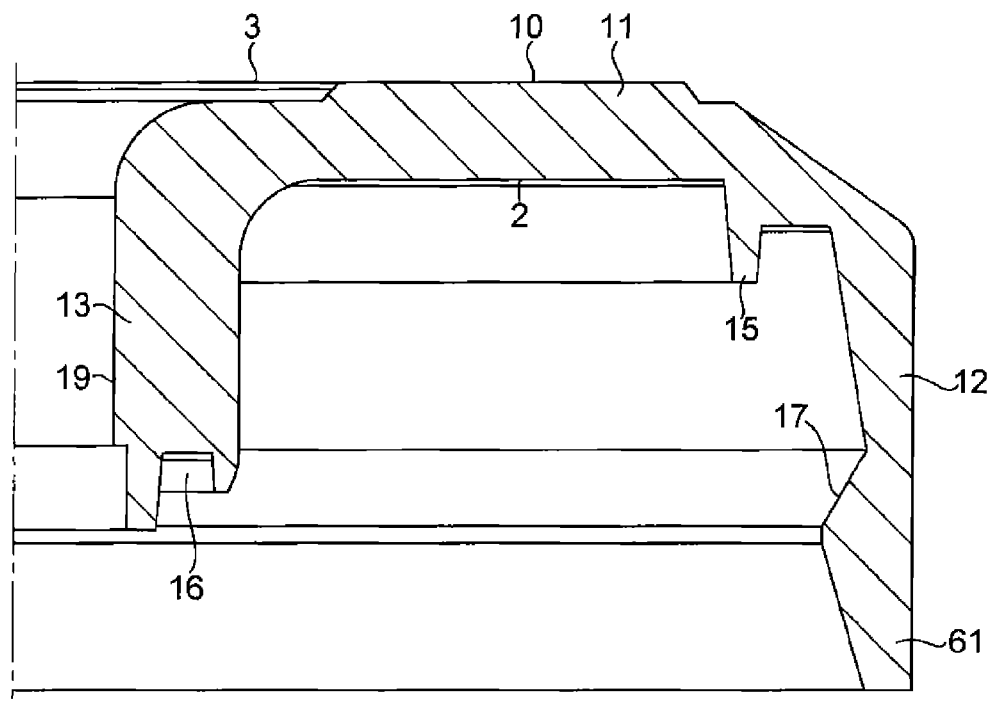
FIG. 8 is a partially enlarged explanatory cross-sectional view of the upper casing shown in FIG. 7.
Figure 9:
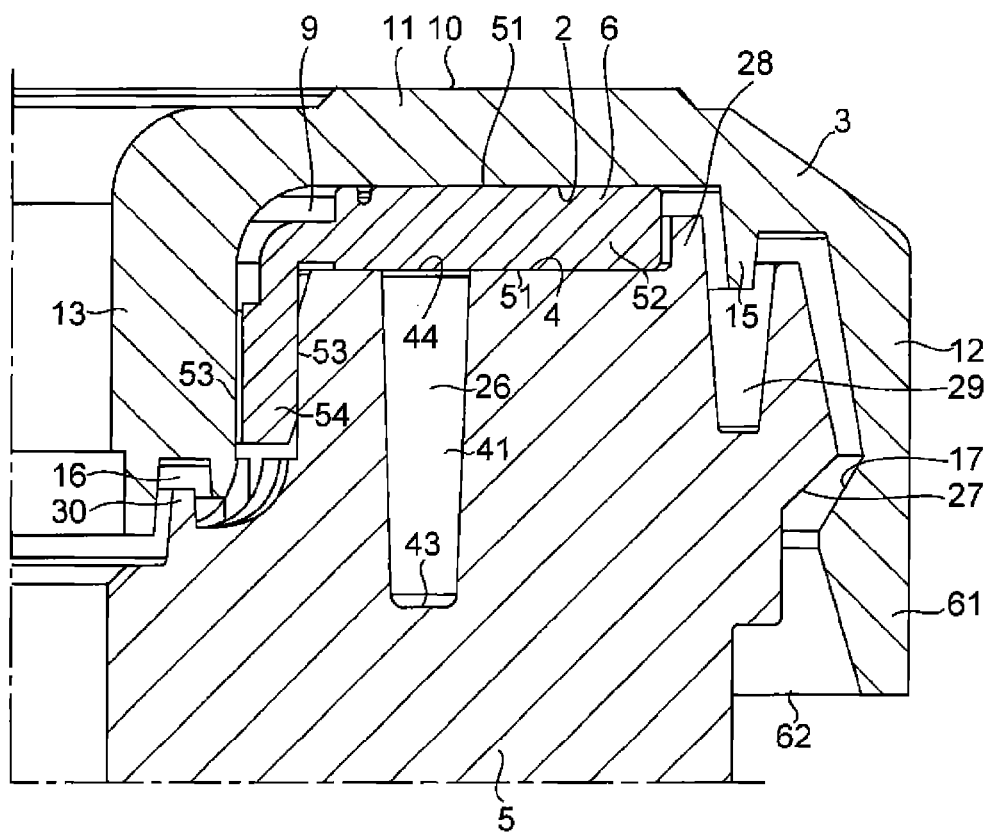
FIG. 9 is a partially enlarged explanatory cross-sectional view of the thrust sliding bearing of the embodiment shown in FIG. 1.

An annular projection 30 projecting toward the upper casing 3 is integrally formed on the upper surface of the cylindrical portion 22, and such an annular projection 30 is disposed in the annular recessed groove 16. A plurality of ribs 31 which are arranged at equal intervals in the circumferential direction are provided at a connecting portion between the upper surface of the cylindrical portion 22 and the inner peripheral surface of the circular ring-shaped base portion 21. It should be noted that the lower casing 5 may have recessed portions 45 each formed between the plurality of ribs 31, as shown in FIG. 6.

The annular projection 15 and the annular recessed groove 29 form a labyrinth structure on the outer peripheral side of the thrust sliding bearing piece 6, and the annular recessed groove 16 and the annular projection 30 form a labyrinth structure on the inner peripheral side of the thrust sliding bearing piece 6. These labyrinth structures prevent the ingress of foreign objects such as dust into the annular gap 9.

The inner peripheral surface 19 of the inner cylindrical suspended portion 13 and an inner peripheral surface 32 of the cylindrical portion 22 define a through hole 35 having the axis O as its center. The vehicle body-side seat surface 10, the thrust sliding bearing surface 51, and the spring seat surface 25 are arranged by being juxtaposed to each other in the axial direction of the thrust sliding bearing 1. That portion of the spring seat surface 25 where the suspension coil spring 7 abuts, i.e., in this embodiment the portion formed by the lower surface 24 of the circular ring-shaped base portion 21 of the spring seat surface 25 where the suspension coil spring 7 abuts, the vehicle body-side seat surface 10, and the thrust sliding bearing surface 51 are arranged in series to each other in the axial direction.

The inside diameter of the outer cylindrical suspended portion 12 at its end portion 61 on the lower casing 5 side is gradually enlarged as the position of the inner peripheral surface of the end portion 61 is located gradually away from the circular ring-shaped base portion 11 in the axial direction. The engaging hook portion 17 which is located closer to the circular ring-shaped base portion 11 side than the end portion 61 is contiguous to the end portion 61. The inner peripheral surface of the end portion 61 is inclined so as to come gradually closer to the outer peripheral side of that end portion 61 as the position of the inner peripheral surface of the end portion 61 is located gradually away from the circular ring-shaped base portion 11. The portion of the outer peripheral surface of the circular ring-shaped base portion 21 opposed to such an end portion 61 is located gradually away from the end portion 61 as the position of the outer peripheral surface of the circular ring-shaped base portion 21 is located gradually away from the circular ring-shaped base portion 11. Since the thrust sliding bearing 1 has such an end portion 61 of the outer cylindrical suspended portion 12, it is possible to suitably prevent the ingress of muddy water from that end portion 61 between the upper casing 3 and the lower casing 5.

Figure 10:
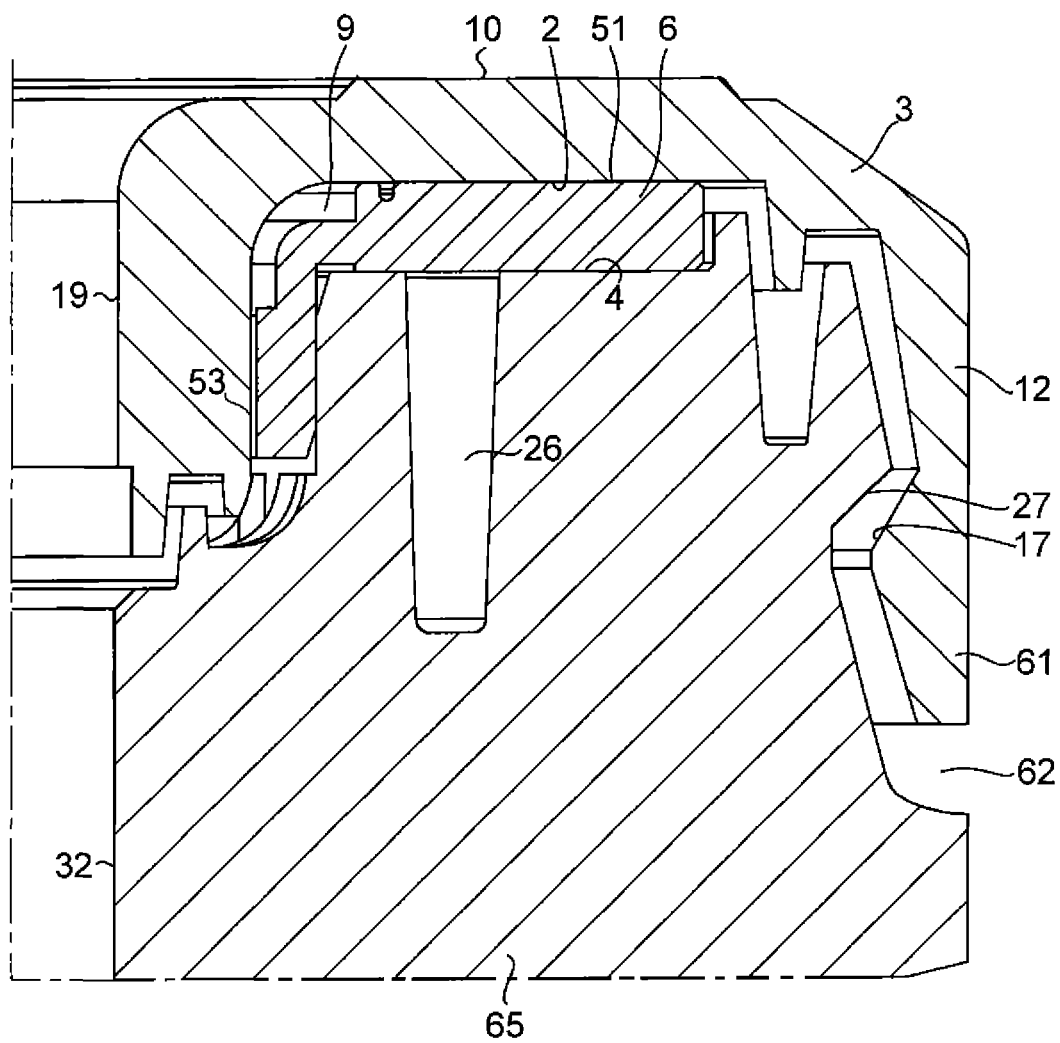
FIG. 10 is a partially enlarged explanatory cross-sectional view of another embodiment of the invention.

It should be noted that an open end 62 which is defined by the end portion 61 and the portion of the outer peripheral surface of the circular ring-shaped base portion 21 opposed to that end portion 61 is oriented toward the spring seat surface 25 in this embodiment, but this open end 62 may be oriented toward the outer peripheral side of the thrust sliding bearing 1 by adopting instead of the lower casing 5 a lower casing 65 in which the shape of the portion of the outer peripheral surface of the circular ring-shaped base portion 21 opposed to the end portion 61 is curved toward the outer peripheral side, as shown in FIG. 10.

The plurality of recessed portions 26 are constituted by a plurality of recessed portions 41 having the shape of a triangle in a plan view and arranged at equal intervals in the circumferential direction and a plurality of recessed portions 42 having the shape of an inverse triangle in a plan view and respectively located between adjacent ones of the plurality of recessed portions 41. Each of the recessed portions 41 and 42 gradually expands from a bottom surface 43 toward an opening 44. The depth of each of the recessed portions 41 and 42 is about two-thirds of the thickness of the circular ring-shaped base portion 21.

Such a lower casing 5 is molded as a raw material is injected into a mold from a plurality of gates arranged at equal intervals in the circumferential direction and located in correspondence with each of the inner peripheral surface 32 and a lower surface 33 of the cylindrical portion 22. Since the lower casing 5 has the plurality of recessed portions 26, even if the lower casing 5 undergoes thermal deformation and the like at the time of injection molding, such deformation can be allowed to take place locally at those recessed portions 26. Moreover, since the recessed portions 26 are formed on the annular upper surface 4, it is possible to maintain high fabrication accuracy of the annular upper surface 4, in particular.

The thrust sliding bearing piece 6 has an annular plate body 52 with the thrust sliding bearing surfaces 51 formed on its upper and lower surfaces and a cylindrical portion 54 which is integrally formed on the inner peripheral portion of the annular plate body 52 in such a manner as to extend toward the lower casing 3 side, and has radial sliding bearing surfaces 53 formed on its inner peripheral surface and outer peripheral surface. The surface roughness in the circumferential direction of the thrust sliding bearing surfaces 51 and the radial sliding bearing surfaces 53 is 1 μm or less, preferably 0.5 μm or less and more preferably 0.1 μm or less. It should be noted that the surface roughness of the annular lower surface 2, the annular upper surface 4, the outer peripheral surface of the inner cylindrical suspended portion 13, and the inner peripheral surface of the circular ring-shaped base portion 21 preferably is equal to or less than the surface roughness of the thrust sliding bearing surfaces 51 and the radial sliding bearing surfaces 53.

The annular plate body 52 has an outside diameter smaller than the inside diameter of the annular projection 28, and the cylindrical portion 54 has an inside diameter greater than the outside diameter of the inner cylindrical suspended portion 13 and an outside diameter smaller than the inside diameter of the circular ring-shaped base portion 21. The thrust sliding bearing piece 6 is disposed in the annular gap 9 between the annular lower surface 2 and the annular upper surface 4, between the outer peripheral surface of the inner cylindrical suspended portion 13 and the inner peripheral surface of the circular ring-shaped base portion 21, and between the annular projections 28 and 30, slidably abuts at each of the thrust sliding bearing surfaces 51 against each of the annular lower surface 2 and the annular upper surface 4, and slidably abuts at each of the radial sliding bearing surfaces 53 against each of the outer peripheral surface of the inner cylindrical suspended portion 13 and the inner peripheral surface of the circular ring-shaped base portion 21.

It should be noted that grooves for lubricating oil, in which a lubricant oil such as grease is filled, may be formed on the upper surface of the annular plate body 52 of the thrust sliding bearing piece 6 and on the inner peripheral surface of the cylindrical portion 54 thereof. Such grooves for lubricating oil may be constituted by such as an annular groove and a plurality of radial grooves extending radially from this annular groove.

According to the thrust sliding bearing 1 in accordance with this embodiment, the thrust sliding bearing 1 is comprised of the synthetic resin-made upper casing 3 which has the vehicle body-side seat surface 10 for the vehicle body side and the annular lower surface 2; the synthetic resin-made lower casing 5 on which the annular upper surface 4 opposed to the annular lower surface 2 and the spring seat surface 25 for the suspension coil spring 7 are integrally formed, and which is superposed on the upper casing 3 so as to be rotatable about the axis O of the upper casing 3 in the R direction; and the thrust sliding bearing piece 6 which is disposed in the annular gap 9 between the annular lower surface 2 and the annular upper surface 4, and has the annular thrust sliding bearing surface 51 which slidably abuts against at least one of the annular lower surface 2 and the annular upper surface 4. Since the vehicle body-side seat surface 10, the thrust sliding bearing surface 51, and the spring seat surface 25 are arranged by being juxtaposed to each other in the axial direction, it is possible to reduce the possibility that deflection is likely to occur in such as the lower casing 5 where the spring seat surface 25 is integrally formed when the vehicle body load is supported.

According to the thrust sliding bearing 1, that portion of the spring seat surface 25 where the suspension coil spring 7 abuts, the vehicle body-side seat surface 10, and the thrust sliding bearing surface 51 are arranged in series to each other in the axial direction, it is possible to further reduce the possibility that the deflection is likely to occur.

According to the thrust sliding bearing 1, the thrust sliding bearing piece 6 has the annular thrust sliding bearing surface 51 which slidably abuts against the annular lower surface 2, and the lower casing 5 has the plurality of recessed portions 26 serving as the plurality of recessed portions or hole portions formed in the annular upper surface 4. Therefore, deformations such as expansion and shrinkage based on thermal change at the time of injection molding of the synthetic resin-made lower casing 5 can be allowed to take place locally at the aforementioned plurality of recessed portions 26. Hence, it is possible to prevent a decline in the fabrication accuracy of the lower casing 5 on which the spring seat surface 25 is integrally formed particularly a decline in the fabrication accuracy of the annular upper surface 4 of the lower casing 5.

According to the thrust sliding bearing 1, the lower casing 5 includes the circular ring-shaped base portion 21 having the annular upper surface 4 formed thereon and the cylindrical portion 22 formed integrally on the lower portion of the circular ring-shaped base portion 21. The spring seat surface 25 is formed by the outer peripheral surface 23 of the cylindrical portion 22 and the lower surface 24 of the circular ring-shaped base portion 21. That portion formed by the lower surface 24 of the circular ring-shaped base portion 21 of the spring seat surface 25 where the suspension coil spring 7 abuts, the vehicle body-side seat surface 10, and the thrust sliding bearing surface 51 are arranged in series to each other in the axial direction. Therefore, it is possible to further reduce the possibility that the deflection is likely to occur.

According to the thrust sliding bearing 1, the upper casing 3 includes the circular ring-shaped base portion 11 having the vehicle body-side seat surface 10 formed on its upper surface and the annular lower surface 2 formed on its lower surface, as well as the outer cylindrical suspended portion 12 which is suspended from the outer peripheral portion of the circular ring-shaped base portion 11 toward the lower casing 5 side. The inside diameter of the outer cylindrical suspended portion 12 at its end portion 61 on the lower casing 5 side is gradually enlarged as the position of the inner peripheral surface of the end portion 61 is located gradually away from the circular ring-shaped base portion 11 in the axial direction. Therefore, it is possible to suitably prevent the ingress of muddy water from the end portion 61 of the outer cylindrical suspended portion 12 between the upper casing 3 and the lower casing 5.

Figure 11:
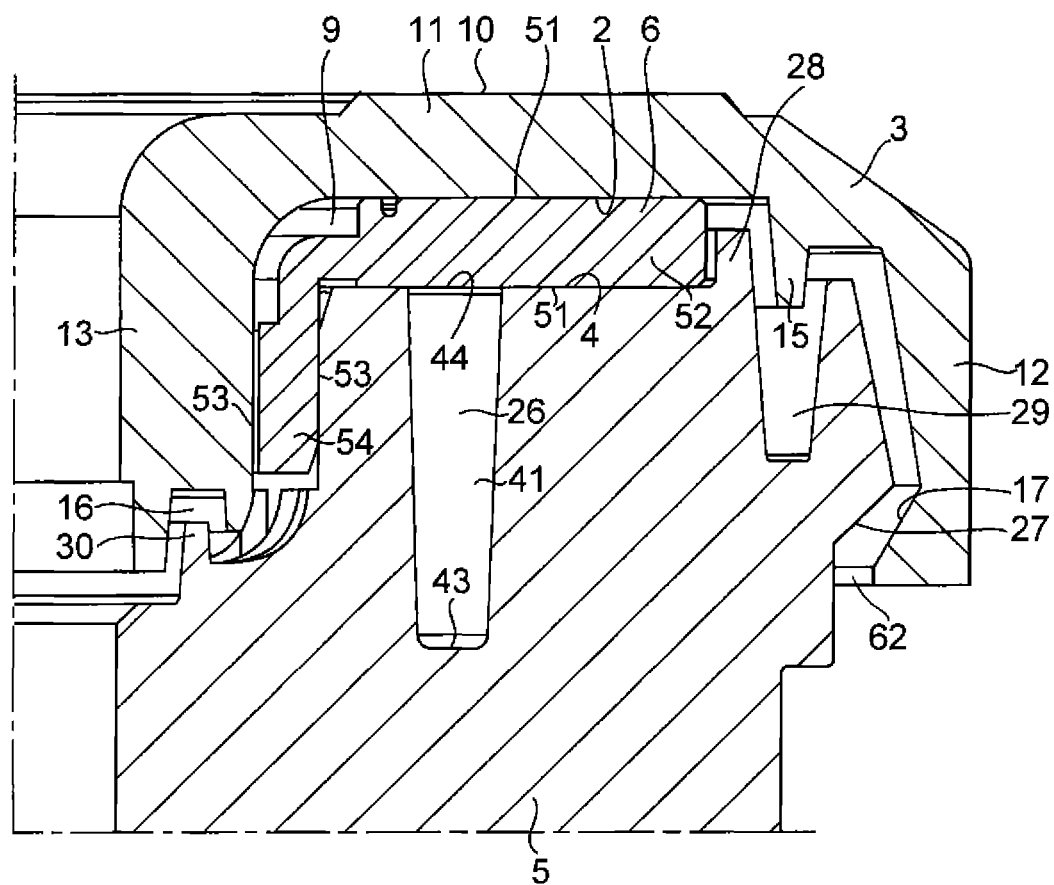
FIG. 11 is a partially enlarged explanatory cross-sectional view of still another embodiment of the invention.

Although in the above-described embodiment the outer cylindrical suspended portion 12 has the end portion 61 with an inside diameter which is gradually enlarged as the position of the inner peripheral surface of the end portion 61 is located gradually away from the circular ring-shaped base portion 11 in the axial direction, the outer cylindrical suspended portion 12 may alternatively be formed so as to terminate at the end portion where the engaging hook portion 17 is formed, by omitting the end portion 61, as shown in FIG. 11. In this case, the open end 62 which is defined by the engaging hook portion 17 and a portion of the outer peripheral surface of the circular ring-shaped base portion 21 opposed to that engaging hook portion 17 is open toward the spring seat surface 25.

The invention claimed is:

1. A thrust sliding bearing comprising:
a synthetic resin-made upper casing which has a vehicle body-side seat surface for a vehicle body side and an annular lower surface;
a synthetic resin-made lower casing on which an annular upper surface opposed to the annular lower surface and a spring seat surface for a suspension coil spring are integrally formed, and which is superposed on said upper casing so as to be rotatable about an axis of said upper casing;
a thrust sliding bearing piece which is disposed in an annular gap between the annular lower surface and the annular upper surface, and has an annular thrust sliding bearing surface which slidably abuts against at least one of the annular lower surface and the annular upper surface, wherein the vehicle body-side seat surface, the thrust sliding bearing surface, and the spring seat surface are arranged by being juxtaposed to each other in an axial direction, wherein said thrust sliding bearing piece has the annular thrust sliding bearing surface which slidably abuts against the annular lower surface, and said lower casing has a plurality of recessed portions or hole portions formed in the annular upper surface of the lower casing which abut a lower surface of the thrust sliding bearing piece, and wherein said lower casing includes an annular base portion having the annular upper surface and a cylindrical portion formed integrally on a lower portion of the annular base portion, the spring seat surface is formed by an outer peripheral surface of the cylindrical portion and a lower surface of the annular base portion, and a portion formed by the lower surface of the annular base portion of the spring seat surface where the suspension coil spring abuts, the vehicle body-side seat surface, and the thrust sliding bearing surface are arranged in series to each other in the axial direction.

2. The thrust sliding bearing according to claim 1, wherein the plurality of recessed portions or hole portions are arranged at equal intervals in a circumferential direction.

3. The thrust sliding bearing according to claim 1, wherein said upper casing includes an annular base portion having the vehicle body-side seat surface and the annular lower surface, and an outer cylindrical suspended portion suspended from an outer peripheral portion of the annular base portion toward said lower casing, and an inside diameter of the outer cylindrical suspended portion at an end portion of the outer cylindrical suspended portion on the lower casing is gradually enlarged as a position of an inner peripheral surface of the end portion is located gradually away from the annular base portion in the axial direction.

4. The thrust sliding bearing according to claim 3, wherein a portion of an outer peripheral surface of said lower casing opposed to the end portion of the outer cylindrical suspended portion on the lower casing side is located gradually away from the end portion as the position of the outer peripheral surface of said lower casing is located away from the annular base portion of said upper casing.

5. The thrust sliding bearing according to claim 3, wherein an annular engaging hook portion having a shape of a recessed surface for engaging said lower casing is formed on an inner peripheral surface of the outer cylindrical suspended portion, and the engaging hook portion is adjacent to the end portion of the outer cylindrical suspended portion on the lower casing side.

6. The thrust sliding bearing according to claim 1 for use as a thrust sliding bearing of a strut suspension in a four-wheeled motor vehicle.

\* \* \* \* \*